United States Patent
Dal Bo et al.

(10) Patent No.: US 9,296,657 B2
(45) Date of Patent: Mar. 29, 2016

(54) HYDRAULIC COMPOSITION

(71) Applicant: Construction Research & Technology, GmbH, Trostberg (DE)

(72) Inventors: Alessandro Dal Bo, Roncade (IT); Gianmaria Marinello, Scorze (IT); Maurizio Pietrobon, Paese (IT); Alan Tommasi, Carbonera (IT)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 14/428,865

(22) PCT Filed: Sep. 23, 2013

(86) PCT No.: PCT/EP2013/069652
§ 371 (c)(1),
(2) Date: Mar. 17, 2015

(87) PCT Pub. No.: WO2014/053341
PCT Pub. Date: Apr. 10, 2014

(65) Prior Publication Data
US 2015/0232388 A1  Aug. 20, 2015

(30) Foreign Application Priority Data
Oct. 4, 2012  (EP) ..................................... 12187198

(51) Int. Cl.
C04B 24/02 (2006.01)
C04B 28/04 (2006.01)
C04B 28/06 (2006.01)

(52) U.S. Cl.
CPC ...................................... C04B 28/04 (2013.01)

(58) Field of Classification Search
CPC .. C04B 14/022; C04B 14/042; C04B 14/043; C04B 14/06; C04B 14/14; C04B 14/16; C04B 14/18; C04B 14/20; C04B 14/24; C04B 14/26; C04B 14/28; C04B 14/303; C04B 14/305; C04B 14/308; C04B 16/08; C04B 18/08; C04B 20/0048; C04B 22/143; C04B 24/02; C04B 28/02; C04B 28/04; C04B 28/06; C04B 28/065; C04B 38/02; C04B 38/08
USPC ................................. 106/724, 802
See application file for complete search history.

(56) References Cited

U.S. PATENT DOCUMENTS

| | | | |
|---|---|---|---|
| 3,607,369 | A | 9/1971 | Batta |
| 4,491,480 | A | 1/1985 | Schenker et al. |
| 5,389,143 | A | 2/1995 | Abdelrazig et al. |
| 6,251,180 | B1 | 6/2001 | Engstrand et al. |

FOREIGN PATENT DOCUMENTS

| | | | | |
|---|---|---|---|---|
| CN | 1261085 A | 7/2000 | | |
| DE | 32 45 843 A1 | 6/1984 | | |
| DE | 33 21 027 A1 | 12/1984 | | |
| DE | 20 2006 016 797 U1 | 12/2006 | | |
| EP | 0 308 950 A1 | 3/1989 | | |
| EP | 0 573 036 A1 | 12/1993 | | |
| GB | 2093856 A | * | 9/1982 | ................ C09J 3/00 |
| JP | S 48-43014 A | 6/1973 | | |
| JP | S 48-43010 B1 | 12/1973 | | |
| JP | S 59-128240 A | 7/1984 | | |
| JP | S 59-131552 A | 7/1984 | | |
| JP | H 02-247217 A | 10/1990 | | |
| JP | H 02-307849 A | 12/1990 | | |
| JP | 2001-213746 A | * | 8/2001 | ............... A61K 8/21 |
| WO | WO 95/04009 A1 | 2/1995 | | |
| WO | WO 95/30630 A1 | 11/1995 | | |
| WO | WO 96/06058 A1 | 2/1996 | | |
| WO | WO 2010/013744 A1 | 2/2010 | | |

OTHER PUBLICATIONS

Machine Translation of Korean Patent Specification No. KR 1020020035727 (May 2002).*
Machine Translation of Korean Patent Specification No. KR 1020040095998 (Nov. 2004).*
PCT/EP2013/069652—International Search Report, mailed Jan. 31, 2014.
PCT/EP2013/069652—Inernational Written Opinion, mailed Jan. 31, 2014.
PCT/EP2013/069652—International Preliminary Report on Patentability, issued Apr. 7, 2015.

* cited by examiner

*Primary Examiner* — Anthony J Green
(74) *Attorney, Agent, or Firm* — Curatolo Sidoti Co., LPA; Joseph G. Curatolo; Salvatore A. Sidoti

(57) ABSTRACT

The invention relates to a composition comprising, based on the dry weight of said composition, (A) 10 to 70% by weight of one or more hydraulic binder and (B) 20 to 85% by weight of one or more filler, wherein the composition contains 0.05 to 5% by weight, based on the amount of the hydraulic binder, of at least one terpenoid alcohol, wherein the terpenoid alcohol is not terpineol or borneol. Additionally disclosed is a hardened product made by the composition and the use of at least one terpenoid alcohol in a composition, comprising hydraulic binder and filler, to reduce the shrinkage of the wet composition during curing.

22 Claims, No Drawings

HYDRAULIC COMPOSITION

CROSS REFERENCE TO RELATED APPLICATIONS

This application is a national stage application of International Application No. PCT/EP2013/069652, filed 23 Sep. 2013, which claims priority from European Patent Application No. 12187198.2, filed 4 Oct. 2012, from which applications priority is claimed, and which are incorporated herein by reference.

The present invention relates to a hydraulic composition comprising at least one terpenoid alcohol. Additionally disclosed is a hardened product made by the composition and the use of at least one terpenoid alcohol in a hydraulic composition to reduce the shrinkage of the wet composition during curing.

Hydraulic materials provide cured articles excellent in strength and durability. Accordingly, the hydraulic materials have been widely used as cement compositions such as a cement paste, a mortar and a concrete. The hydraulic materials are indispensable for the construction of civil engineering and architectural structures.

One of the negative properties of cement, in particular the Portland cement mostly used, is the shrinkage or contraction of the hydraulic materials, which leads to volume changes of the setting mortars or concretes. If the structure is subjected to internal (i.e. by aggregate or reinforced steel) or external restraint, cracking can result from tensile stresses induced during shrinkage. Cracking of material causes the decrease of service life and durability of the resultant structure. Further, the cracks provide a mean for water and aggressive salts and gases to seep into and through the structure. Water, salts and gases further deteriorate the structure through freeze-thaw cycling pressures, carbonation and corrosion of metal reinforcements, chemical interaction with the hydrated cement. Reductions in strength, durability, and the like of each of the civil engineering and architectural structures cause serious problems such as a reduction in safety and an increase in repair cost Efforts are therefore made to keep the shrinkage tendency as low as possible.

Several strategies have been proposed to offset the effect of drying shrinkage, among them it can be mentioned the following.

By varying the composition of the components and the mix proportion of mortar and concrete such as:
  cement having low $C_3A$ content or low $C_3A/SO_3$ ratio or low alkali ($Na_2O$ and $K_2O$) content;
  reduction of water/cement ratio,
  cement content, for a constant W/C ratio an incremental decrease of cement content decreases the drying shrinkage;
  aggregate content, any increment of aggregate content reduce drying shrinkage.

All these strategies based on compositions and mix design can be applied only to a limited extend without compromising the performance of the materials, therefore their effectiveness is limited.

Use of expansive additives can reduce total shrinkage. Expansive agents are special products which can increase the volume of concrete and mortars due to specific chemical reactions. There are various families of expansive agents; the most important are based on the formation of ettringite or calcium oxide. However, it is difficult to determine the proper amount of expansive additive required to counter the drying shrinkage which develops in different environmental conditions. The use of such materials thereby gives rise to unpredictable results.

Internal curing compounds like superabsorbent polymers and pre-saturated lightweight aggregates have been reported to reduce drying shrinkage, but they have a minor effect compared shrinkage reducing admixtures and they strongly affect the mortar workability and strength.

Another strategy often mentioned is the use of fibers on mortar and concrete. The incorporation of fibers is effective to improve toughness and cracking resistance, but not to reduce drying shrinkage.

Emphasis has been recently placed on shrinkage-reducing agents for hydraulic materials as means for reducing the drying shrinkage of cured concrete articles. Numerous shrinkage reducers, shrinkage-reducing additives and admixtures have been developed and employed with the goal of reducing drying shrinkage and delaying or preventing cracking. They are claimed to change the surface tension, disjoining pressure and capillary tension in the water/air menisci created in the capillary pores of cementitious concrete and mortar. In addition to influencing drying shrinkage, this reduction in surface tension can potentially be applied beneficially to reduce autogenous shrinkage and the evaporative loss of water during early age curing.

The use of different alcohol compounds as shrinkage-reducing agents for hydraulic cement is known. WO2010013744 provided a shrinkage-reducing agent for hydraulic material and a general-purpose shrinkage-reducing agent by the general formula (1): $R^1—[O-(A^1O)m-R^2]_n$ (1) wherein $R^1$ is a residue resulting from a polyhydric alcohol represented by the general formula: $R^1—[OH]_n$; $A^1O$ is oxyalkylene having 2 to 18 carbon atoms; $R^2$ is hydrogen or a hydrocarbon group having 1 to 30 carbon atoms; m is the average number of oxyalkylene ($A^1O$) units added; n is 3 or 4; and when n is 3, m is 30 to 150, while n is 4, m is 5 to 150.

U.S. Pat. No. 6,251,180 describes a shrinkage-reducing agent intended as additive in aqueous cement comprising compositions. The agent comprises at least one acetal, preferably a cyclic formal, of a tri- or polyhydric alcohol, which acetal comprises at least one 1,3-dioxa group.

JP-A-73 43 014 proposes the adding of secondary or tertiary alcohols, specifically glycerine, to cement-containing materials to prevent the shrinkage.

JP-A-59 128 240 describes polyoxyethylene ethers with a terminal OH group as shrinkage-reducing additives in mixtures with fluorine-containing emulsifiers.

JP2307849 claims a shrinkage reducer for cement made of a mixture of one or more kinds of alcohols represented by a general formula ROH, where R is 4-6C alkyl or 5-6C cycloalkyl. The alcohols may be butanol and cyclopentanol.

EP 308950, EP 573036, JP 48043010, JP 59131552, made known that alcohols, such as secondary and tertiary polyalcohols, alkanediols, acetylenic diols and polyvinyl alcohol, optionally in combination with surface active fluorocompounds and/or silica, have a certain performance as shrinkage-reducing agents in cement compositions. Alcohols are, furthermore, used as milling additives, which is disclosed in German patent application DE 3245843.

Various other alcohols, polyols and polyethers have been suggested as shrinkage control agents. WO 95/30630 discloses a composition comprised of cement and 0.1-10%, preferably 0.5-4% based on weight cement of an alkyl ether derivative of an aliphatic polyhydroxy compound having the formula $Q-[(A)_n-OR]_x$ wherein Q is $C_3-C_{12}$ aliphatic hydrocarbon group, each R is hydrogen or a $C_1-C_{10}$ alkyl group at least one being the $C_1$-$C_{10}$ alkyl group, A is a $C_2$-$C_4$ oxyalkylene group, n is 0-10, and x is 3-5.

WO 96/06058 discloses a cement admixture composed of a compound with at least one secondary or tertiary hydroxyl group and at least one water reducing agent with a formula R'C(OH)R—(CH$_2$)n-RC(OH)R' wherein each R independently represents a H atom or a $C_1$-$C_2$ group and each R' independently represents a $C_1$-$C_2$ alkyl and n is an integer of 1-2. Inclusion of 0.8-4% of the admixture per weight cement produces a shrinkage reducing effect, which is enhanced by the inclusion in the admixture of a water reducing agent in a ratio polyol:water reducing agent of 100:1 to 1:6.

Further known compounds which can reduce the shrinkage are glycols, especially polyethylenglycol, pentanediol, hexanediol and neopentylglycol.

It is a disadvantage of alcohol based shrinkage-reducing agents, that they mostly retard the hardening of hydraulic cements and concretes. Thus they are not recommended to be used, when a rapid hardening is needed. Further the alcohol based products are hydrophilic and they are washed out from the cured product. In this way the long term shrinkage reduction properties are decreased and the water resistance is lowered.

The use of terpens in hydraulic material is also known. DE 3321027 claims a process for improving the physical properties of cement pastes, cement mortars and concrete by the addition of terpene polymers, in particular of liquid low-molecular terpenes alone or as a mixture with other terpene hydrocarbons, which are added to the cement containing building materials in a quantity of 0.1-10% by weight, relative to the binder weight, whereby an increase in strength by 20-30%, a reduction in efflorescence and a reduction in water absorption are obtained.

JP 2 247217 discloses a rapidly curing cement composition that is retarded in very rapid curing properties and not adversely affects the pourability of the cement composition comprising a hydraulic cement with a filler, an organic polyisocyanate, terpineol and water. In this formulation terpineol is used as retardant.

CN 1 261 085 describes a composition comprising, based on the dry weight of said composition, 16-20% by weight of white cement, 20-25% by weight of gypsum and 0.05-0.2% by weight, based on the weight of hydraulic binder, of borneol. In this formulation borneol is used as bactericide.

An object of the present invention is to provide a shrinkage reducer for a hydraulic material with high efficiency and without the disadvantages described above.

This object is achieved by a composition comprising, based on the dry weight of said composition, (A) 10 to 70% by weight of one or more hydraulic binder and (B) 20 to 85% by weight of one or more filler, wherein the composition contains 0.05 to 5% by weight, preferably 0.1 to 4% by weight, more preferably 0.1 to 3% by weight and most preferably 0.1 to 1% by weight, based on the amount of the hydraulic binder, of at least one terpenoid alcohol, wherein the terpenoid alcohol is not terpineol or borneol.

Surprisingly this composition achieves a better shrinkage reduction effect than the compositions based on known shrinkage reducing products. Furthermore the composition according to the present invention is not afflicted with the disadvantages of compositions based on known shrinkage reducing products. Additionally the composition according to the present invention has a better corrosion inhibition and antifouling properties.

In a preferred embodiment, the terpenoid alcohol according to the present invention is at least one selected from the group consisting of menthol, linalool, tetrahydro linalool, citronellol, nerol, geraniol, tetrahydro geraniol, myrcenol, farnesol, bisabolol, nerolidol, phytol, retinol, cafestol and prenol.

The terpenoid alcohol according to the present invention is preferably at least one monoterpenoid alcohol from the group consisting of menthol, linalool, tetrahydro linalool, citronellol, nerol, geraniol, tetrahydro geraniol and myrcenol. More preferably the terpenoid alcohol is at least one monoterpenoid alcohol from the group consisting of linalool, tetrahydro linalool, citronellol, nerol, geraniol, tetrahydro geraniol and myrcenol.

In further preferred embodiments, the terpenoid alcohol is at least one sesquiterpenoid alcohol selected from the group consisting of farnesol, bisabolol and nerolidol, or the terpenoid alcohol is at least one diterpenoid alcohol from the group consisting of phytol, retinol and cafestol or the terpenoid alcohol is prenol.

The manner of adding the terpenoid alcohol to the composition according to the present invention may be the same as with ordinary cement admixtures. For example, the terpenoid alcohol is admixed with a suitable proportion of water and then this composition is mixed with cement, filler and where appropriate further additives. Further, a suitable amount of the terpenoid alcohol may be added when cement, filler and where appropriate further additives are mixed with water. As an alternative, a suitable amount of the terpenoid alcohol may be added when cement, filler and where appropriate further additives are mixed in dry form.

In particular, the hydraulic binder used according to the invention can preferably be at least one binder selected from the group consisting of cement based on portland cement, aluminate cement, blastfurnace cement, mixed cements, white cement, sulfoaluminate cement, and a latent hydraulic or pozzolanic binder such as fly ash, metakaolin, silica dust, hydraulic lime and slag sand. Particular preference is given to cement based on portland cement, aluminate cement, sulfoaluminate cement and mixed cements, in particular portland cement.

It is an essential feature of the invention that the composition contains from 10 to 70% by weight of one or more hydraulic binder. In general, the amount of hydraulic binder is in the range from 12 to 60% by weight, in particular 15 to 55% by weight, preferably 20 to 40% by weight.

The proportion of fillers in the composition according to the present invention is 20 to 85% by weight. The fillers used are in particular metal carbonates, fly ash, limestone, quartz, iron oxide, barite, alumina, titania, carbon black, gypsum, talc or mica, silica sand, silica flour, dolomite, gravel, rock, basalt, metal-silicates perlite, mineral foam, foam beads, pumice, expanded glass, hollow glass beads and calcium silicate hydrate.

Furthermore, the composition according to the present invention may contain limestone powder as a filler, in particular in amounts of 20 to 80% by weight, preferably 20 to 40% by weight, particularly preferably 25 to 35% by weight, based on the dry composition. Limestone powder preferred according to the invention contains at least 90% by weight, preferably at least 95% by weight, of calcium carbonate, based on the limestone powder. Particularly good results are obtained with a limestone powder having a bulk density of 800 to 1000 g/l, in particular 900 to 950 g/l. Limestone powder preferred for the purposes of the present invention has a Blaine specific surface area of 3500 to 4500 cm²/g, preferably 3750 to 4250 cm²/g, particularly preferably of about 4000 cm²/g.

Preferably, the composition according to the present invention contains silica sand as a filler, in particular in amounts of 20 to 85% by weight, preferably 25 to 50% by weight, particularly preferably 30 to 35% by weight, based on the dry composition. According to a particular embodiment of the present invention, a mixture of silica sands of different particle sizes and/or different Blaine specific surface areas is used. In particular, a slightly finer particled silica sand is combined with a slightly coarser particled silica sand. Silica sand preferred according to the invention has an $SiO_2$ content of more than 95% by weight, preferably of more than 98% by weight, based on the silica sand. Silica sand preferred according to the invention has a theoretical specific surface area (Blaine) of at least 60 cm²/g, preferably at least 70 cm²/g, particularly preferably at least 80 cm²/g.

Furthermore, it may be intended for the composition according to the present invention to contain further ingredients and/or additives in order to optimize the performance characteristics. Such ingredients or additives may be selected, for example, from the group consisting of plasticizers, redispersible polymer powders, defoamers, stabilizers, water retention agents, thickeners, levelling agents, dedusting agents, pigments, hydrophobizing and water repellent additives, expansive agents, air entraining agents, corrosion inhibitors, fibres, retarding and accelerating admixtures.

For example, the composition according to the present invention may contain at least one plasticizer, in particular in amounts of 0.01 to 5% by weight, preferably 0.05 to 2% by weight, particularly preferably 0.1 to 0.5% by weight, based on the dry composition. Examples of preferred plasticizers are plasticizers based on lignosulfonates, sulfonated naphthaline-formaldehyde condensates, sulfonated melamine-formaldehyde condensates and modified polycarboxylate ethers. In particular, the plasticizers are selected in such a way that they reduce the water requirement on mixing and in addition advantageously also lead to particularly good development of early strength or promote this.

For optimizing performance characteristics, the composition according to the present invention may furthermore contain an additive which improves or influences the rheological and/or physical properties. This may be, for example, based on a polymer powder redispersible in water, preferably based on vinyl acetate and ethylene (ethylene/vinyl acetate copolymer). Such an additive can be used in particular in amounts of 1 to 15% by weight, preferably 2 to 10% by weight, based on dry composition. It is also possible to use a polymer dispersion in liquid form.

In a preferred variant the composition according to the present invention comprises a water-soluble organic polymeric protective colloid having a content of monocarboxylic acid and dicarboxylic acid as well as their anhydrids of more than 50 mol % and/or consisting of aromatic sulphonic acid condensates. In a further preferred embodiment the composition does not contain a water-soluble organic polymeric protective colloid.

The composition according to the present invention may contain at least one defoamer, for example a fixed combination of liquid hydrocarbons, polyglycols and amorphous silica. Such an defoamer can be used in particular in amounts of 0.001 to 3% by weight, preferably 0.05 to 1% by weight, based on the dry composition.

Furthermore, the composition according to the present invention may also contain at least one stabilizer. Such stabilizers may be selected, for example, from gums (e.g. Diutan gum) or may be based on cellulose or celluose derivatives (e.g. hydroxyethyl-cellulose). Moreover, different stabilizers can be combined with one another, e.g. gums on the one hand and cellulose or cellulose derivatives on the other hand. If gums are used as stabilizers, they can be used in amounts of 0.001 to 0.2% by weight, preferably 0.03 to 0.08% by weight, based on the dry composition. If cellulose or cellulose derivatives (e.g. hydroxyethylcellulose) are used as stabilizers, they can be used in amounts of 0.001 to 0.5% by weight, preferably 0.05 to 0.15% by weight, based on the dry composition.

Moreover, the composition according to the present invention may contain at least one additive for adjusting the water retentivity. Methylcellulose in particular may be present in the mixture in an amount of 0.5 to 2% by weight, preferably 0.8 to 1.5% by weight, as a water retention agent.

Finally, in a preferred embodiment the composition according to the present invention may also contain thickeners, which are preferably selected from the series consisting of swellable phyllosilicates (e.g. bentonites, attapulgites, kaolinites) and polyacrylates or combinations thereof and are preferably used in an amount of 0.5 to 2% by weight.

A further aspect is the use of the composition according to the present invention as a factory dry mortar. In particular, the factory dry mortar is a repair mortar, bricklaying mortar, render mortar, mortar for composite thermal insulation systems, renovation render, joint grout, tile adhesive, thin bed mortar, screed mortar, embedding mortar, injection mortar, knifing filler, sealing slurry, lining mortar, machinery grout and structural grout.

When the composition according to the present invention is used as a factory dry mortar it may tend to form substantial amounts of dust, particularly during transfer and mixing processes. In a preferred embodiment, a dedusting agent can therefore be added, said dedusting agent preferably being an aliphatic hydrocarbon or polyethylene glycol. Regarding the preferred dedusting agents, reference may also be made to DE 20 2006016797, which is hereby incorporated by reference in the application.

Furthermore, pigments, in particular from the series consisting of the iron oxides, may also be added to the composition according to the present invention.

For controlling the setting time, setting regulators, in particular hydroxides, inorganic and/or organic acids and/or salts thereof and alkali metal carbonates or mixtures of these compounds can be added. In particular, calcium hydroxide, citric acid and/or salts thereof, lithium, sodium and/or potassium carbonate or mixtures of these compounds are added as setting regulators. The amount of setting regulator can be varied within wide ranges. In general, the setting regulator is used in amounts of 0.001 to 3% by weight, in particular 0.01 to 0.25% by weight, based on the dry composition. Nevertheless, it may be necessary, if appropriate, to deviate from the abovementioned values.

The composition according to the present invention incorporating the terpenoid alcohol may be applied in conventional ways. For example, it may be trowelled, filled in forms, applied by spraying, or injected by means of a caulking gun. Hardening or curing of the composition may be by any of the air drying, wet air, water and heat-assisted (steam, autoclave, etc.) curing techniques. If desired, two or more such techniques may be combined. The respective curing conditions may be the same as in the past.

A further aspect of the present invention is a hardened product made by a composition according to the present invention.

Furthermore, the present invention provides the use of 0.05 to 5% by weight, based on the amount of the hydraulic binder, of at least one terpenoid alcohol in a composition comprising, based on the dry weight of said composition, (A) 10 to 70% by weight of one or more hydraulic binder and (B) 20 to 85% by weight of one or more filler, to reduce the shrinkage of the wet composition during curing.

Overall, the present invention provides a composition which is distinguished by a substantially improved shrinkage behavior.

The following examples illustrate the advantages of the present invention.

EXAMPLES

Description of the Test Methods

Test methods used in the examples are the following:

Flow according to EN 13395-1 "Determination of workability. Test for flow of thixotropic mortars"

Density according to EN 1015-6 "Determination of bulk density of fresh mortar"

Drying shrinkage according to EN 12617-4 "Test methods. Determination of shrinkage and expansion"

Powder and water are conditioned at 20 to 23° C.

| Mortars (ingredients and amounts): | |
|---|---|
| Mortar 1 | |
| Portland cement type I 52.5 R | 40.0% by weight |
| Microsilica | 3.0% by weight |
| Expansive agent | 2.0% by weight |
| Superplasticizer (BNS) | 2.0% by weight |
| Silica sand 0-2 mm | 54.8% by weight |
| Mortar 2 | |
| Portland cement type I 52.5 R | 25.0% by weight |
| Calcium aluminate cement | 10.0% by weight |
| Gypsum | 5.0% by weight |
| Citric acid | 0.2% by weight |
| Lithium carbonate | 0.2% by weight |
| Redispersible polymer powder | 3.0% by weight |
| Lightweight aggregate | 5.0% by weight |
| Silica sand | 51.6% by weight |
| Mortar 3 | |
| Portland cement type I 52.5 R | 35.0% by weight |
| Microsilica | 2.0% by weight |
| Expansive agent | 2.0% by weight |
| Superplasticizer (BNS) | 0.1% by weight |
| Silica sand 0-2 mm | 60.9% by weight |

Example 1

Two different dosages of terpenoid alcohol (menthol) are added to mortar 1.

| Product | Water % | Flow EN 13395-1 mm | Density EN 1015-6 g/dm³ | Drying Shrinkage EN 12617-4 mm/m | | |
|---|---|---|---|---|---|---|
| | | | | 4 days | 7 days | 28 days |
| Mortar 1 reference | 17 | 185 | 2120 | 0.37 | 0.5 | 1.14 |
| with 0.1% by weight menthol | 17 | 185 | 2140 | 0.27 | 0.41 | 0.97 |
| with 0.2% by weight menthol | 17 | 185 | 2145 | 0.14 | 0.27 | 0.72 |

The addition of increasing amounts of menthol, decreases the shrinkage at all curing ages.

Example 2

Two different dosages of menthol terpenoid alcohol are added to mortar 2.

| Product | Water % | Flow EN 13395-1 mm | Density EN 1015-6 g/dm³ | Drying Shrinkage EN 12617-4 mm/m | | |
|---|---|---|---|---|---|---|
| | | | | 4 days | 7 days | 28 days |
| Mortar 2 (reference) | 20 | 178 | 1870 | 0.23 | 0.28 | 0.43 |
| with 0.1% by weight menthol | 20 | 178 | 1860 | 0.19 | 0.21 | 0.37 |
| with 0.2% by weight menthol | 20 | 175 | 1845 | 0.19 | 0.2 | 0.32 |

The addition of menthol to a ternary binder based mortar causes a reduction of drying shrinkage at the different curing ages.

Example 3

Different terpenes and terpenoids having different isoprene units and different functional groups (alcohol, ether, ketone) are compared in term of drying shrinkage reduction on reference mortar 3.

| 1 | Menthol | cyclic monoterpenoid alcohol |
|---|---|---|
| 2 | Menthone | cyclic monoterpene ketone |
| 3 | Linalool | linear monoterpenoid alcohol |
| 4 | Camphor | bicyclic monoterpenic ketone |
| 5 | Eucalyptol | bicyclic monoterpenoic ether |
| 6 | Fanesol | sesquiterpenoid alcohol |

| Product | Water % | Flow EN 13395-1 mm | Density EN 1015-6 g/dm³ | Drying Shrinkage EN 12617-4 mm/m | | |
|---|---|---|---|---|---|---|
| | | | | 2 days | 7 days | 28 days |
| Mortar 3 reference | 17 | 180 | 2180 | 0.09 | 0.45 | 1.11 |
| with 0.1% by weight additive 1 | 17 | 180 | 2160 | 0.10 | 0.36 | 0.98 |
| with 0.1% by weight additive 2 | 17 | 180 | 2160 | 0.06 | 0.39 | 1.20 |
| with 0.1% by weight additive 3 | 17 | 185 | 2145 | 0.15 | 0.38 | 0.94 |
| with 0.1% by weight additive 4 | 17 | 180 | 2155 | 0.20 | 0.5 | 1.12 |
| with 0.1% by weight additive 5 | 17 | 180 | 2145 | 0.17 | 0.85 | 1.13 |
| with 0.1% by weight additive 6 | 17 | 185 | 2160 | 0.10 | 0.43 | 0.99 |

Only terpenoid alcohols (additives 1, 3 and 6) show a shrinkage reduction, while terpene ether 5 and terpene ketones 2 and 4 do not achieve any shrinkage reduction.

Example 4

Five drying shrinkage admixtures based on different alcohols are compared with two terpenoid alcohols according to the present invention in terms of drying shrinkage reduction.

| Product | Water % | Flow EN 13395-1 mm | Drying Shrinkage EN 12617-4 mm/m 3 days | 7 days | 28 days |
|---|---|---|---|---|---|
| Mortar 3 (reference) | 17 | 185 | 0.27 | 0.82 | 1.62 |
| with 0.1 n-butanol | 17 | 188 | 0.17 | 0.62 | 1.47 |
| with 0.1% by weight cyclopentanol | 17 | 183 | 0.20 | 0.72 | 1.63 |
| with 0.1% by weight 2-ethyl 1,3-dioxane 5-methanol | 17 | 185 | 0.15 | 0.66 | 1.51 |
| with 0.1% by weight 2-amino 2-methyl 1-propanol | 17 | 183 | 0.09 | 0.45 | 1.43 |
| with 0.1% by weight 2-amino 1-butanol | 17 | 180 | 0.00 | 0.51 | 1.28 |
| with 0.1% by weight menthol | 17 | 175 | 0.07 | 0.51 | 1.27 |
| with 0.1% by weight linalool | 17 | 175 | 0.00 | 0.37 | 1.12 |

The two terpenoid alcohols obtained the best results in terms of shrinkage reduction among all different alcohols. In particular, linalool achieved a 12.5% shrinkage reduction compared to the best of the various alcohol shrinkage reducing admixtures namely the 2-amino 1-butanol.

The invention claimed is:

1. A factory dry mortar composition comprising, based on the dry weight of said composition,
   (A) 10 to 70% by weight of one or more hydraulic binder comprising at least one binder selected from the group consisting of Portland cement, aluminate cement, sulfoaluminate cement, hydraulic lime and mixtures thereof, and
   (B) 20 to 85% by weight of one or more filler, characterized in that
   the composition contains 0.05 to 5% by weight, based on the amount of the hydraulic binder, of at least one terpenoid alcohol, wherein the terpenoid alcohol is not terpineol or borneol.

2. The composition according to claim 1, characterized in that the terpenoid alcohol is at least one selected from the group consisting of menthol, linalool, tetrahydro linalool, citronellol, nerol, geraniol, tetrahydro geraniol, myrcenol, farnesol, bisabolol, nerolidol, phytol, retinol, cafestol and prenol.

3. The composition according to claim 1, characterized in that the terpenoid alcohol is at least one monoterpenoid alcohol selected from the group consisting of menthol, linalool, tetrahydro linalool, citronellol, nerol, geraniol, tetrahydro geraniol and myrcenol.

4. The composition according to claim 1, characterized in that the terpenoid alcohol is at least one sesquiterpenoid alcohol selected from the group consisting of farnesol, bisabolol and nerolidol.

5. The composition according to claim 1 characterized in that the terpenoid alcohol is at least one diterpenoid alcohol selected from the group consisting of phytol, retinol and cafestol.

6. The composition according to claim 1, characterized in that the terpenoid alcohol is prenol.

7. The composition according to claim 1, characterized in that the composition comprises a water-soluble organic polymeric protective colloid having a content of monocarboxylic acid and dicarboxylic acid or anhydrides thereof of more than 50 mol % and/or consisting of aromatic sulphonic acid condensates.

8. The composition according to claim 1, characterized in that the composition does not contain a water-soluble organic polymeric protective colloid.

9. The composition according to claim 1, characterized in that the filler comprises at least one filler selected from the group consisting of metal carbonates, fly ash, limestone, quartz, iron oxide, barite, alumina, titania, carbon black, gypsum, talc, mica, silica sand, silica flour, dolomite, gravel, rock, basalt, metal-silicates perlite, mineral foam, foam beads, pumice, expanded glass, hollow glass beads and calcium silicate hydrate.

10. The composition according to claim 1, characterized in that the composition contains at least one additive selected from the group consisting of plasticizers, redispersible polymer powders, defoamers, stabilizers, water retention agents, thickeners, levelling agents, dedusting agents, pigments, hydrophobizing additives, water repellent additives, expansive agents, air entraining agents, corrosion inhibitors, fibres, retarding admixtures and accelerating admixtures.

11. The composition according to claim 1, characterized in that the factory dry mortar is a repair mortar, bricklaying mortar, render mortar, mortar for composite thermal insulation systems, renovation render, joint grout, tile adhesive, thin bed mortar, screed mortar, embedding mortar, injection mortar, knifing filler, sealing slurry, lining mortar, machinery grout or structural grout.

12. A hardened product comprising a composition according to claim 1.

13. A method of reducing the shrinkage of a wet composition during curing, the composition comprising, based on the dry weight of said composition,
   (A) 10 to 70% by weight of one or more hydraulic binder comprising at least one binder selected from the group consisting of Portland cement, aluminate cement, sulfoaluminate cement, hydraulic lime and mixtures thereof, and
   (B) 20 to 85% by weight of one or more filler,
   comprising adding 0.05 to 5% by weight, based on the amount of the hydraulic binder, of at least one terpenoid alcohol to the composition.

14. The method of claim 13, wherein the terpenoid alcohol is at least one selected from the group consisting of menthol, linalool, tetrahydro linalool, citronellol, nerol, geraniol, tetrahydro geraniol, myrcenol, farnesol, bisabolol, nerolidol, phytol, retinol, cafestol and prenol.

15. The method of claim 13, wherein the terpenoid alcohol is at least one monoterpenoid alcohol selected from the group consisting of menthol, linalool, tetrahydro linalool, citronellol, nerol, geraniol, tetrahydro geraniol and myrcenol.

16. The method of claim 13, wherein the terpenoid alcohol is at least one sesquiterpenoid alcohol selected from the group consisting of farnesol, bisabolol and nerolidol.

17. The method of claim 13, wherein the terpenoid alcohol is at least one diterpenoid alcohol selected from the group consisting of phytol, retinol and cafestol.

18. The method of claim 13, wherein the terpenoid alcohol is prenol.

19. The method of claim 13, wherein the filler comprises at least one filler selected from the group consisting of metal carbonates, fly ash, limestone, quartz, iron oxide, barite, alumina, titania, carbon black, gypsum, talc, mica, silica sand, silica flour, dolomite, gravel, rock, basalt, metal-silicates perlite, mineral foam, foam beads, pumice, expanded glass, hollow glass beads and calcium silicate hydrate.

20. The method of claim 13, wherein the composition comprises at least one additive selected from the group consisting of plasticizers, redispersible polymer powders, defoamers, stabilizers, water retention agents, thickeners, levelling agents, dedusting agents, pigments, hydrophobizing additives, water repellent additives, expansive agents, air entraining agents, corrosion inhibitors, fibres, retarding admixtures and accelerating admixtures.

21. The method of claim 13, wherein the composition further comprises a water-soluble organic polymeric protective colloid having a content of monocarboxylic acid and dicarboxylic acid or anhydrides thereof of more than 50 mol % and/or consisting of aromatic sulphonic acid condensates.

22. A composition comprising, based on the dry weight of said composition,
- (A) 10 to 70% by weight of one or more hydraulic binder comprising at least one binder selected from the group consisting of Portland cement, aluminate cement, sulfoaluminate cement, hydraulic lime and mixtures thereof, and
- (B) 20 to 85% by weight of one or more filler, characterized in that the composition contains 0.05 to 5% by weight, based on the amount of the hydraulic binder, of at least one terpenoid alcohol, wherein the terpenoid alcohol is not terpineol or borneol, and a water-soluble organic polymeric protective colloid having a content of monocarboxylic acid and dicarboxylic acid or anhydrides thereof of more than 50 mol % and/or consisting of aromatic sulphonic acid condensates.

\* \* \* \* \*